United States Patent
Wagner et al.

[11] Patent Number: 6,101,264
[45] Date of Patent: Aug. 8, 2000

[54] PERSON IDENTIFICATION BASED ON MOVEMENT INFORMATION

[75] Inventors: Thomas Wagner, Erlangen, Germany; Friedrich G. Boebel, FontaineBleau, France; Norbert Bauer, Erlangen, Germany

[73] Assignee: Fraunhofer Gesellschaft Fuer Angewandte Forschung e.V. et al, Munich, Germany

[21] Appl. No.: 08/716,247

[22] PCT Filed: Mar. 14, 1995

[86] PCT No.: PCT/DE95/00351

§ 371 Date: Nov. 26, 1996

§ 102(e) Date: Nov. 26, 1996

[87] PCT Pub. No.: WO95/25316

PCT Pub. Date: Sep. 21, 1995

[30] Foreign Application Priority Data

Mar. 15, 1994 [DE] Germany ............................ 44 08 792
Apr. 20, 1994 [DE] Germany ............................ 44 13 788

[51] Int. Cl.$^7$ ............................. G06K 9/00; G06K 9/62
[52] U.S. Cl. .......................................... 382/115; 382/155
[58] Field of Search ................................... 382/112, 118, 382/115, 279, 282, 321; 395/20–25

[56] References Cited

U.S. PATENT DOCUMENTS

| | | | |
|---|---|---|---|
| 4,757,541 | 7/1988 | Beadles | 381/43 |
| 4,841,575 | 6/1989 | Welsh et al. | 381/36 |
| 4,975,960 | 12/1990 | Petajan | 381/43 |
| 5,161,204 | 11/1992 | Hutcheson et al. | 382/190 |
| 5,163,111 | 11/1992 | Baji et al. | 395/22 |

(List continued on next page.)

FOREIGN PATENT DOCUMENTS

| | | | |
|---|---|---|---|
| 0082304 | 6/1983 | European Pat. Off. | A61B 5/00 |
| 5-166090 | 7/1993 | Japan | G08B 23/00 |

OTHER PUBLICATIONS

Wagner et al. (Multi–Sensorial Inputs for The Identification of Persons With Synergetic Computers, IEEE, pp. 287–291), 1994.

Mase et al., Automatic Lipreading by Optical–flow Analysis, System and Computer in Japan, vol. 22, No. 6, 1991.

Haken, Synergetic, IEEE Circuits and Devices Magazine, Nov. 1988.

Zakhor et al., Edge–Based 3–D Camera Motion Estimation With Application to Video Coding, IEEE Transactions on Image Processing vol. 2, No. 4 (1993), New York, US, pp. 481–498.

Hartwig et al., Digitale Bildcodierung, (Teil 12) FKT Fernseh–und Kino–Technik vol. 47, No. 1, (1993) Heidelberg, DE, pp. 33–42.

Wagner, et al., Using a Synergetic Computer in an Industrial Classification Problem, Artificial Neural Networks and Genetic Algorithms, (Apr. 1993) Innsbruck, AT, pp. 206–212.

Yamasaki et al., Advanced Intelligent Sensing System Using Sensor Fusion, IECON'92, (1992) San Diego, CA, US, pp. 1–8.

Kenji, Automatic Lipreading by Optical–flow Analysis, Systems and Computers in Japan, vol. 22, No. 6, (1992) Japan, pp. 67–76.

Horn et al., Determining Optical Flow, Artificial Intelligence Laboratory, Massachusetts Institute of Technology, (1981) Cambridge, MA, US pp. 185–203.

*Primary Examiner*—Jose L. Couso
*Assistant Examiner*—Duy M. Dang
*Attorney, Agent, or Firm*—Duane, Morris and Heckscher LLP

[57] ABSTRACT

A method of identification of an individual is based on movement information. Movement information from an image sequence that results when a typical or predetermined movement is carried out by the individual to be identified is recorded and evaluated by means of optical flow in order to ensure high recognition dependability. Complementary audio and static image information may also be evaluated.

11 Claims, 4 Drawing Sheets

U.S. PATENT DOCUMENTS

| | | | |
|---|---|---|---|
| 5,164,992 | 11/1992 | Turk et al. | 382/115 |
| 5,274,714 | 12/1993 | Hutcheson et al. | 382/155 |
| 5,410,609 | 4/1995 | Kado et al. | 382/115 |
| 5,412,738 | 5/1995 | Brunelli et al. | 382/115 |
| 5,426,745 | 6/1995 | Baji et al. | 395/375 |
| 5,432,864 | 7/1995 | Lu et al. | 382/118 |
| 5,497,430 | 3/1996 | Sadovnik et al. | 382/156 |
| 5,586,215 | 12/1996 | Stork et al. | 395/2.41 |
| 5,621,858 | 4/1997 | Stork et al. | 395/2.41 |

PERSON IDENTIFICATION BASED ON MOVEMENT INFORMATION

BACKGROUND OF THE INVENTION

1. Field of the Invention

The invention relates to the identification of individuals by evaluation of information inherent to the individual itself and without using auxiliary means, such as identity paper, keys or personal identification numbers

2. Prior Art

A reliable recognition—thus an identification—of individuals still remains technically unsolved. Current approaches are based on individuals being identified by auxiliary means (examples for this are the often falsified identity paper, the lost key or the too often forgotten personal identification number). Nowadays, also passwords have an only short duration, since they either have a too simple form or may easily be found out by unauthorized persons. It is just the last mentioned danger which frequently occurs when an authorization of access is urgently needed and the entered password (supposed to be correct) does not work.

Reliable identification of individuals, however, also means: protection of a local area against unauthorized access. Examples for this are military installations or danger zones in nuclear power plants. Also, the access to information, such as files or secret service information, which nowadays become more and more important, requires an exact coordination of the authorization of access for persons, dependent on their reliability and competence.

From prior art, the analysis of static images is known, such as face recognition, recognition of handprints or analysis of fingerprints. Due to great variations of an individual's outer appearance and also due to the difficulty in providing reproducible recording conditions, said systems show an "inaccuracy" which is still so high that one cannot speak of a "reliable identification of individuals". The identification of individuals can only be regarded as reliable when working with (almost) 100% accuracy.

SUMMARY OF THE INVENTION

The invention proposes a process for the identification of individuals (humans), wherein movement information from image sequences (FIG. 2) originating from a typical or predetermined movement action at or of said individual, is recorded, evaluated and compared with comparative values with the invention proposes a synergetic computer for the realization of the aforementioned processes.

Instead of the static image according to prior art, the invention uses image sequences. Said image sequences define the movement information being evaluated by calculating an optical flow (compare FIG. 6 and FIG. 7). In order to provide reliable evaluation, at least one of a typical and a predetermined movement action is used, the image sequences of which are evaluated and compared with comparative values. Before carrying out such comparison, the data may be reduced by a classification process, said data reduction providing a filter for large data quantities.

A typical movement action may be at least one of a walk and a head movement; a predetermined movement action may be the movement of a face or a section of a face (lineaments), which movement results from speaking a predetermined word or sentence.

Advantageously, said typical and predetermined movement actions may be combined. The evaluation of said combination may be effected in parallel or interleaved.

An evaluation of static image information may be used in addition to said image sequence information.

Said image sequence information and the evaluation of said static image information may be supplemented by an evaluation of acoustic information to (further) increase reliability.

The subject matter of the invention is directed to a synergetic computer for the realization of the identification process in the aforementioned sense; besides, it is described more in detail in a conference report volume of a conference in Innsbruck (April 1993; pages 206 to 212). The title of said document is "Using a Synergetic Computer in an Industrial Classification Problem"; the subject matter of said conference and the name of said volume is "Artificial Neural Networks and Genetic Algorithms". Particularly item 2 describes the theory on which such a synergetic computer is based, according to which theory one of the special algorithms may be attributed to the solution of a matrix inversion instead of an integration of a system of differential equations. The use of neural networks is also proposed. According to said volume, the field of application was the identification of motor vehicle rims originating from a casting or an injection moulding process. Rests of aluminum (or other metal) remain on the rims and complicate an exact detection. Additionally, the position of the rims to be detected as well as the orientation are diverse and not known to the system.

In an other conference IECON 1992 in San Diego, Calif., from Nov. 9 until 13, 1992, in a lecture, Yamasaki and Takahashi proposed an adaptive sound detection system additionally making use of visual effects to realize the (particularly human) "cocktailparty effect" also in (technical) recognition technics. Said effect manifests itself by a human being in a position to filter out certain information being of interest to him by using his senses despite a considerable background noise and a very bad S/N ratio. Nowadays, this human characteristic has neither been exactly researched nor can it be technically reproduced in such high quality. Accordingly, the intention of the above-mentioned lecture was to filter an audio signal of a source (a sentence spoken by a person) out of a multitude of different surrounding noises, simultaneously improving the signal/noise ratio. The field of application mentioned by the lecture is the recognition of defective machine components (by recognizing "strange" noises) or the recognition of human voices in noisy surroundings (as man-machine-interface, wherein a person acoustically informs the machine which further steps it should apply). The technics mentioned by the lecture uses optical information besides acoustic information and combines said two information sources, so that a "sensor fusion" is obtained. The combination of said two kinds of information is effected on two levels, an audio subsystem and a visual subsystem.

Differently from the aforementioned approaches, the invention substantially uses an image sequence and an optical flow for the realization of a reliable (highly accurate) identification of individuals. Only in addition thereto, acoustic information may be used or static images may be evaluated.

EP 82 304 B1 seems to relate to an image sequence; however, the image sequence used therein is no more than a preliminary stage to locate a suitable instantaneous image (single-image) and to compare it with preliminarily stored information in a usual statistic comparison process. In order to detect said instantaneous image, which, in this document, is called "key event" during speaking a key word, acoustically obtained energy signals are evaluated and when exceeding a threshold value, the relevant single-image is selected (sampled) from the continuously recorded sequence, held and evaluated. Evaluation is not effected by an optical flow, but by a distortion (deformation) of a line or grid pattern projected on the lip area at the time of the key event. Thus, only an evaluation of a single-image is provided which may be combined with an evaluation of acoustic signals.

In contrast thereto, the present invention, as outlined in claim 1 with its substantial features, evaluates the sequence of images in which the single-image is "drowned".

BRIEF DESCRIPTION OF THE DRAWINGS

In the following, the invention shall be described more in detail by schematic drawings on the basis of an embodiment.

DETAILED DESCRIPTION OF THE PREFERRED EMBODIMENTS

Figure 1:
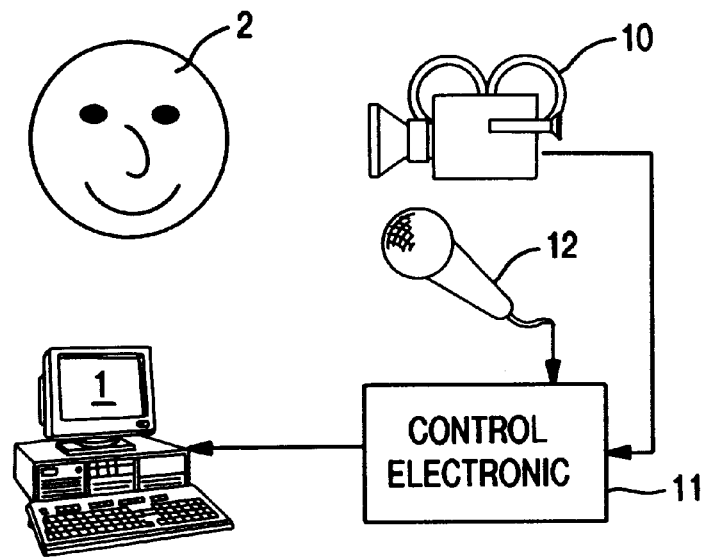
FIG. 1 shows an example of a visual and acoustic recording of information originating from a schematically illustrated person 2.

In FIG. 1, an individual is represented schematically by reference numeral 2. A predetermined movement action of the lineaments of said (schematically represented) individual 2 is shown in FIG. 2 by reference numerals 2a to 2e.

In this embodiment, the system for the identification of said individual 2 uses a high speed camera 10 being directed at said individual 2, as well as a microphone 12 being adapted to record speech signals. The optical signals of said camera 10 and the audio signals of said microphone 12 are supplied to an electronic control 11. Said electronic control 11 is adapted to process said signals such that they may be supplied to a computer 1 for evaluation. It is possible to provide said electronic control already with analog to digital converters (A/D converters) as well to arrange said A/D converters in the evaluation unit 1 itself, so that couplings between the image information sources 10 and 12 are effected on an analogous basis.

Figure 2:
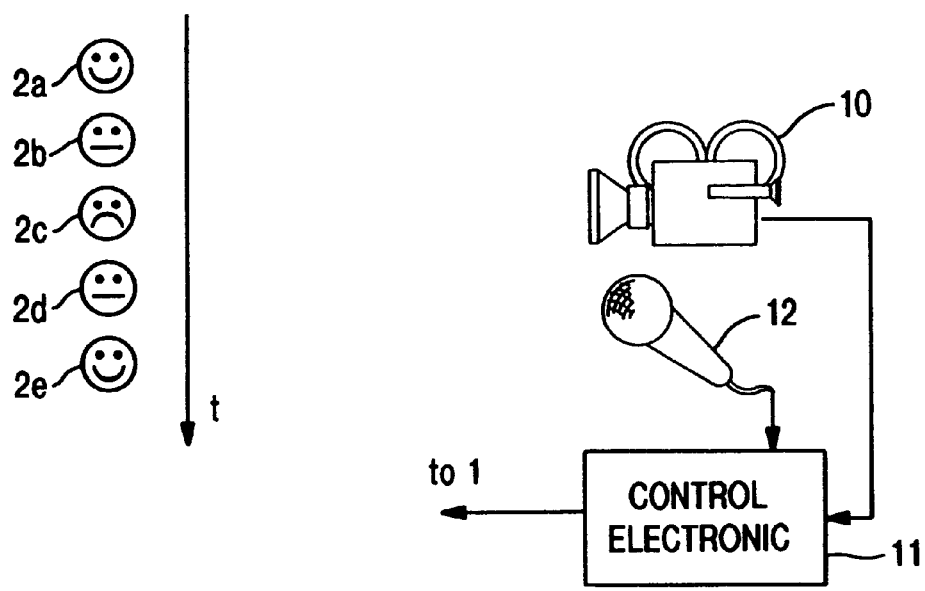
FIG. 2 illustrates a predetermined movement action by lineaments 2a to 2e (shown schematically and in sequence) above an axis of time t (extending in perpendicular direction). Said lineaments are recorded by a high speed camera 10.

In the embodiment according to FIGS. 1 and 2, the process starts with the predetermination of a word, sentence or code word, e.g. the name of the individual to be identified. Said high speed camera 10 and said microphone 12 simultaneously record the signals resulting therefrom and supply it to said electronic control 11. When the word or sentence is spoken, the movements of the face or of a section thereof are recorded. In said evaluation unit, a classification process is programmed to reduce too large data quantities to an evaluable dimension. Beforehand or thereafter, the optical flow of the facial mimicry (lineaments) is calculated, and one of the "stored individuals" is identified with high reliability by means of comparative values. In case there is not recognized identity between the prestored data and the individual requesting access, a repetition of the aforementioned process is possible. In case of higher security levels it may also be advisable not to effect said repetition and to immediately refuse authorization.

The evaluation in said evaluation unit 1 is more in detail a consequence of said optical flow being calculated from the image sequence of said high speed camera 10, which flow reproduces said movement information in compressed form—however not indefinitely exact. Said movement information is composed of a multitude of sampling values of the lineaments, so that fictive points of the face describe a particular movement or movement curve being determined by said optical flow (compare Horn and Schunk, "Determining Optical Flow", Artificial Intelligence, Vol. 17, 1981, pages 185 to 203). The acoustic data are evaluated by a short-time Fourier transform (FFT) in order to adequately reproduce the present frequency information.

Figure 3:
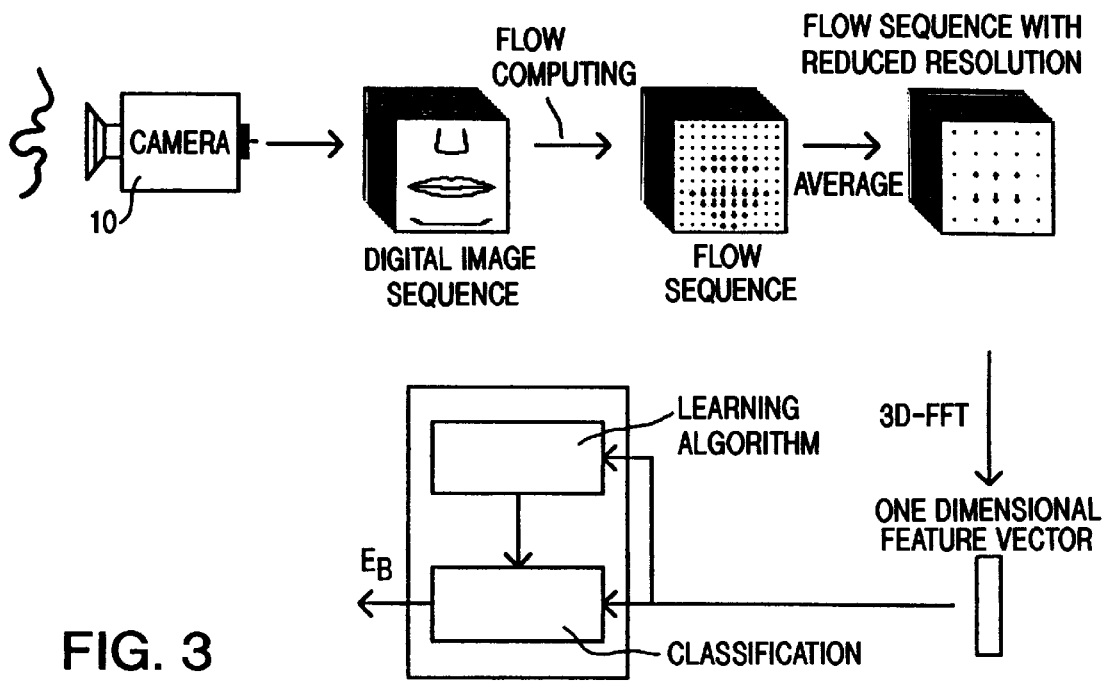
FIG. 3 is an illustration of an optical evaluation path by which the image sequences are processed namely via a flow vector field and a field with reduced resolution (in direction) to a high-dimensional feature vector being fed into a classification process. Said classification process may be programmed in a synergetic computer.
Figure 4:
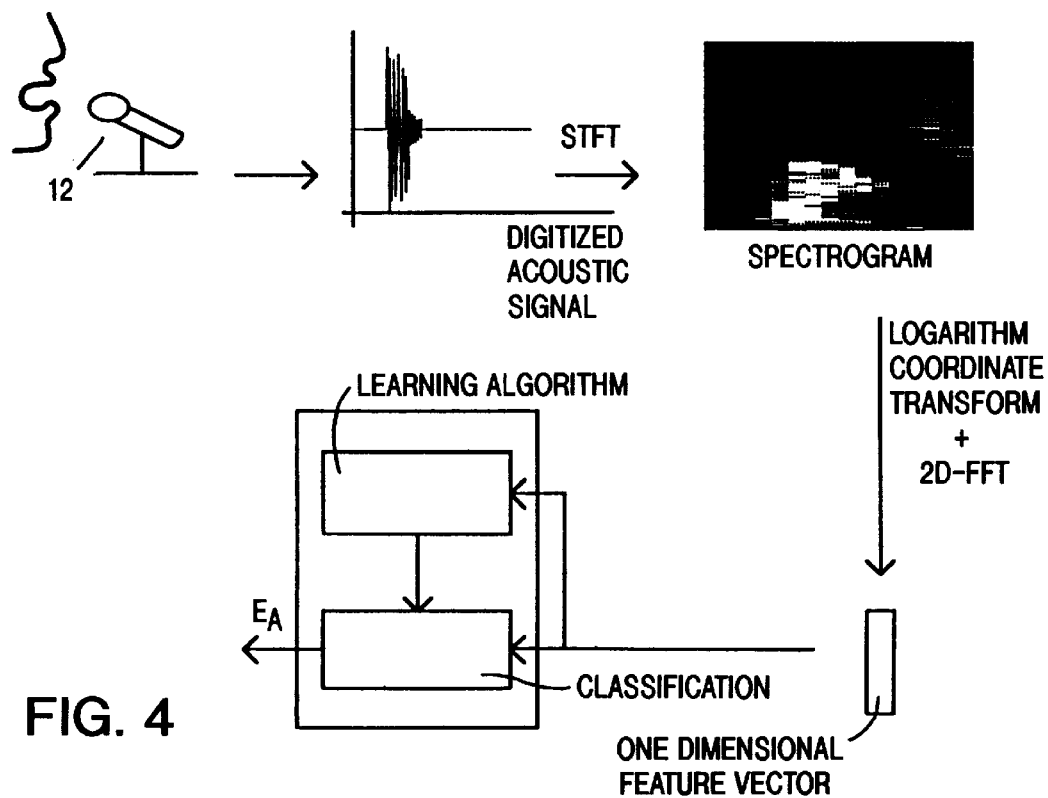
FIG. 4 is an acoustic evaluation path corresponding to FIG. 3, in which path the acoustic signals are digitalized and represented as a spectrogram. In this case also, the path leads over a one-dimensional feature vector being fed into a classification process which may be programmed in a synergetic computer.
Figure 5:
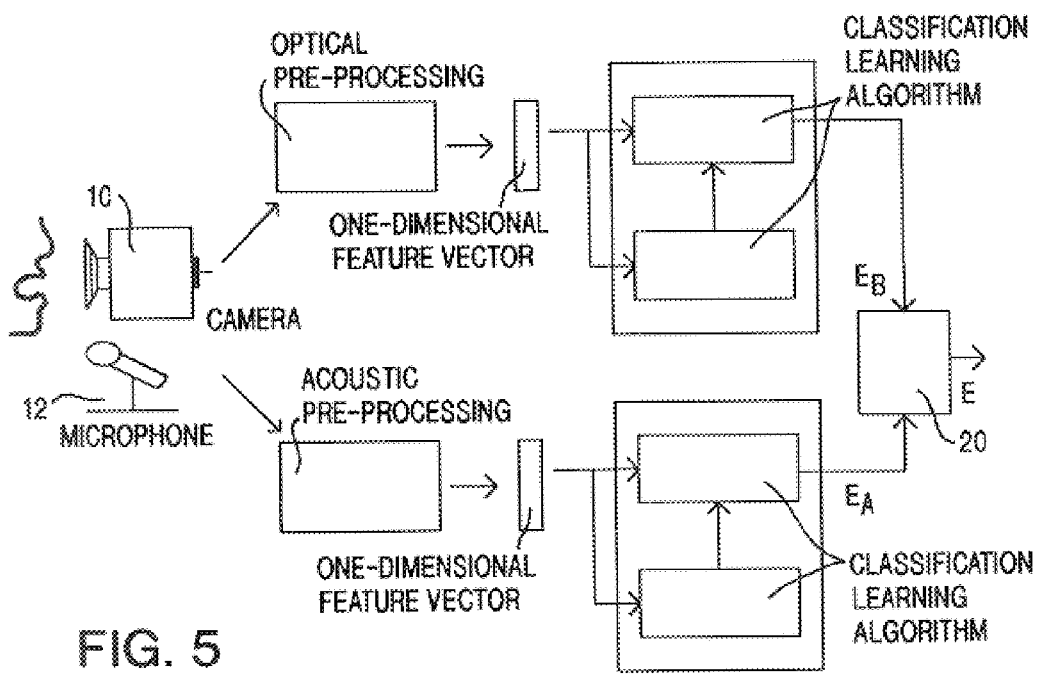
FIG. 5 shows a combination of said two evaluation processes, the optical and acoustic preprocessing as a block diagram comprising those evaluation steps of FIGS. 3 and 4 respectively which are effected before said one-dimensional feature vector. The output signals of said optical classification and said acoustic classification are combined in a link 20 and result in an evaluation signal E which, if used for the identification of individuals, is the statement whether the individual speaking the password or code word is one of the prestored individuals.

The process programmed in said evaluation unit 1 and said electronic control 11 according to FIGS. 1 and 2 are to be found in FIGS. 3, 4 and 5. In FIG. 3, the input information is the optical signal via said camera 10, the output information is an identified individual or a identification signal $E_B$. In FIG. 4, the input information is an acoustic signal via said microphone 12, the output signal is an identification signal $E_A$. Both output values may be combined in a link 20 and constitute an output signal E, which may represent an identified individual. Said link 20 may be provided as a simple AND gate.

The optical processing system illustrated in FIG. 3 processes a real image sequence which is represented in a one-dimensional feature vector being supplied to said classification process. The sequential images of said camera 10 are converted into a digital image sequence, from said images, a flow vector field (flow sequence) is calculated which will be described on the basis of FIGS. 6 and 7; said flow sequence is an image of vector arrows. The flow sequence obtained is converted into a flow sequence with reduced resolution (averaging) to delimit the data quantity.

Said flow sequence with reduced resolution may again be subjected to a Fourier transform if a position invariancy of the image or the individual is desired.

The result is a one-dimensional feature vector which is supplied to classification and from which said identification signal $E_B$ is derived.

The acoustic evaluation according to FIG. 4 operates in a comparable manner. The digitized acoustic signal determines a spectrogram, wherein the high amplitudes are represented brightly and the low amplitudes appear dark. Each line is representative for a sampling period.

In this case also a coordinate transformation may be effected. A logarithmic transformation is favourable for acoustic signals. By said transformation, a tone pitch invariancy is achieved which is comparable with said position invariancy of the optical evaluation according to FIG. 3.

The one-dimensional feature vector being determined for the acoustic signals according to FIG. 4 is supplied to said classification determining an output signal $E_A$ therefrom.

The classification processes according to FIGS. 3 and 4 may be programmed on a synergetic computer.

A combination of the processes of FIGS. 3 and 4 is illustrated in FIG. 5. Each data source (acoustic, optical) extracts suitable features in the described manner, said features representing the acoustic information and the image sequence information respectively in the best possible manner. Said features are held in the one-dimensional numerical vectors and supplied to classification for the determination of output signals $E_B$ or $E_A$, Before describing the evaluation in said classification and the learning algorithm also programmed there, the optical flow is described with reference to FIGS. 6 and 7a, 7b and 7c.

Figure 6:
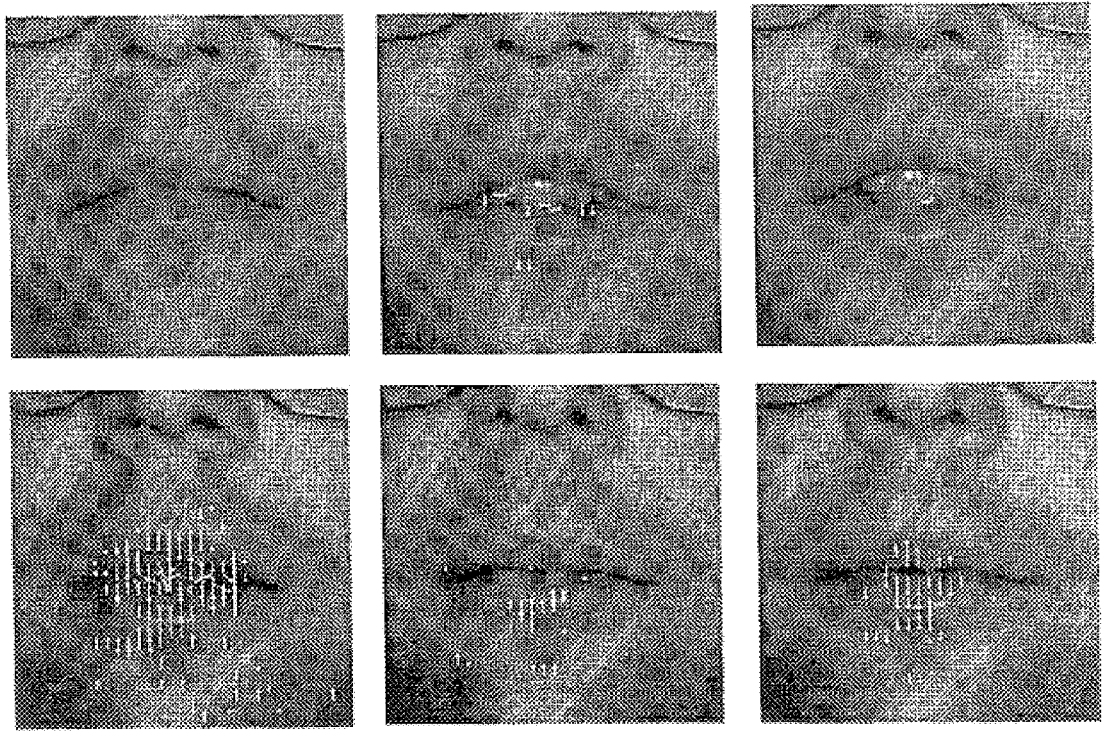
FIG. 6 illustrates by means of a lip sequence of a speaking person the movement action being converted or translated into the optical flow by the circuit according to FIG. 3. The white direction arrows are characteristic for the movement of particular areas around the lips.

In FIG. 6, the optical flow is for example that of a lip area. Fictive points have the movements shown in white, which movements may be evaluated with regard to their length and direction. When a movement is effected, substantially vectors of the determined flow vector fields are to be recognized which vectors extend in vertical direction. A different case is that of a rotatory movement, e.g. of the ball according to FIGS. 7a, 7b. From the flow vector field of FIG. 7 it can be seen that the ball rotates. Thus, the flow vectors are in a position to evaluate each movement of fictive points and to show distinct vectors even in case of static, hardly perceptible differences, which vectors being adapted to determine and to prominently describe the movement action.

Figure 7A:
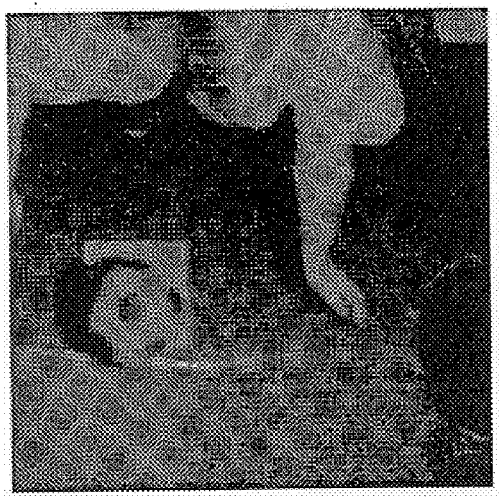
FIGS. 7a, 7b and 7c illustrate an other exemplary movement action, in this embodiment two images of a recorded image sequence, and in FIG. 7c, the flow vector field resulting therefrom. The movement of the ball with direction and rotation is clearly visible, as well as the movement of the child's arm, although there is almost no difference to be seen between the two instantaneous images placed side by side according to FIGS. 7a and 7b. The movement action is obvious—almost more than obvious—from the flow vector field according to FIG. 7c which may be calculated by the circuit according to FIG. 3.
Figure 7B:
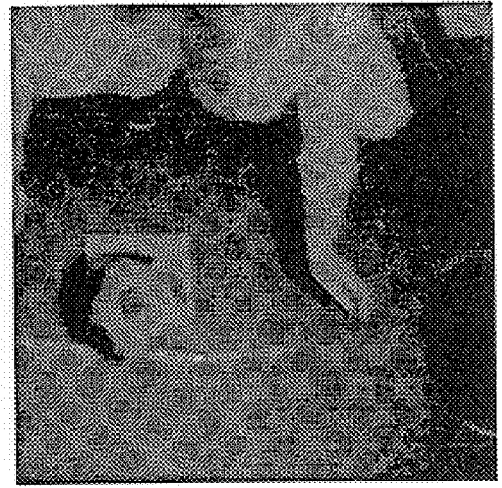
Figure 7C:
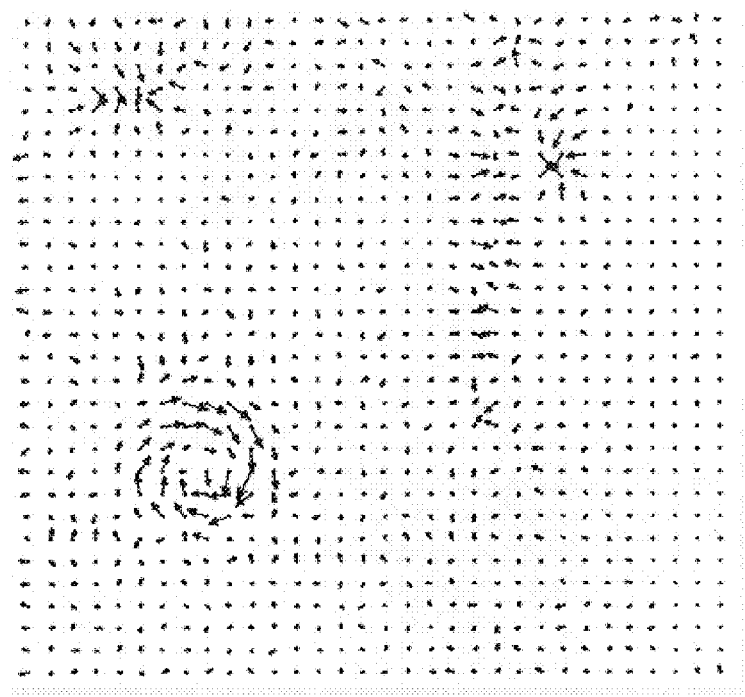

The movement of the child's arm and knee shown in FIGS. 7a and 7b is also visible. The head is almost immobile.

In FIGS. 3, 4 and 5, a learning algorithm is indicated. It serves for the determination of certain individuals known to the system. In such a learning process on a synergetic computer, either the multitude of the features for the optical or acoustic information path, which features having been calculated for each class, are converted into adjoint prototypes. An adjoint prototype exists for each class—each class corresponds to an individual. Said adjoint has the property to give preference to those features in an evaluation which show significant differences between individual classes (individual persons), whereas other features which are almost identical in all classes are more or less disregarded or neglected. Said adjoint is "contrasting".

Said adjoint prototypes are calculated by said learning process, they permit a determined classification of optical or acoustic feature vectors which are still unknown.

Once the learning process effected and a logic record of classes existing, individuals to be identified (a feature vector to be classified or a pattern to be classified) may easily be recognized. Said feature vector is obtained according to the circuits of FIG. 3 and FIG. 4 or FIG. 5 respectively, and then supplied to the classification which may refer to learned classes.

The adjoint prototypes already learnt, which express the characteristics of each individual class (each individual person), are attributed to the still unknown feature vector in the classification mode and recognized as "already existing" or rejected as unknown.

The evaluation of single-images of the recorded image sequence is an advantageous supplement to said sequential and acoustic evaluations. The first and last image of a short period of time have prooved to be suitable single-images; in said period of time the dynamic identification is effected; additionally, they may be used as a source of information for the determination of an individual to be identified.

When combining all three data sources, the three sensor input signals may be entered in a classification process working as described above.

In an experimental arrangement, the above described process for the identification of individuals has revealed that reliable identification rates are obtained, independently of the surrounding conditions (background, scaling, light influence).

A particularly advantageous aspect of the described process is that the individual to be identified does not have to use any auxiliary means, such as keys or identity documents. Marks or signs at the respective individual are also not required. The movement actions upon which the identification is based, the speaking of predetermined words or the execution of typical movement actions, may be modified frequently, so that a non authorized individual is not able to prepare himself for the respective identification test.

What is claimed is:

1. A process for a positive identification of an individual from a set of identifiable individuals, comprising the steps of:

(i) generating a set of classes at least corresponding to the set of identifiable individuals, each class having features which correspond to characteristics of an individual in said set of identifiable individuals;

(ii) providing a camera for recording an image sequence as movement information;

(iii) recording said image sequence with said camera, said sequence originating from at least one of a typical and predetermined movement action associated with a so far unidentified individual;

(iv) evaluating said recorded image sequence through an optical flow thereby producing a feature vector representing movement information contained in the recorded image sequence;

(v) comparing said produced feature vector with at least one class of said set of classes;

(vi) generating a positive identification signal corresponding to a certain class of said set of classes having features corresponding to said feature vector representing said movement information.

2. Process according to claim 1, wherein said predetermined movement action is a movement of lineaments of the individual to be identified when speaking a predetermined word or sentence.

3. Process according to claim 1, wherein said typical movement action is at least one of a walk and a head movement of the individual to be identified.

4. Process according to claim 1, wherein the typical movement action is recorded in combination with a predetermined movement action.

5. Process according to claim 1, wherein the recording of said at least one of a typical and predetermined movement action is combined with a recording of static images, said recorded static images are evaluated in addition to said evaluating of said recorded image sequence.

6. Process according to claim 5, wherein the recording of said static images is combined with a recording of audio information, said recorded audio information is evaluated in addition to said evaluating of said recorded images.

7. Process according to claim 1, wherein the evaluation of said image sequence is combined with an evaluation of audio information.

8. Process according to claim 1, wherein said set of classes is provided for comparing with an unknown feature vector corresponding to the so far unidentified individual, said unknown feature vector being evaluated through said optical flow, wherein one adjoint prototype obtained by a learning process is calculated for each class for comparing with said unknown feature vector.

9. A learning process for a process for a positive identification of an individual from a set of identifiable individuals, comprising the steps of:

(i) generating at least one class in a set of classes at least corresponding to the set of identifiable individuals, each class having features which correspond to characteristics of an individual in said set of identifiable individuals;

(ii) providing a camera for recording an image sequence as movement information;

(iii) recording said image sequence with said camera, said sequence originating from at least one of a typical and predetermined movement action associated with an individual to be represented by said at least one class;

(iv) evaluating said recorded image sequence through an optical flow thereby producing a feature vector representing movement information contained in the recorded image sequence; and calculating an adjoint of said feature vector;

(v) providing said produced adjoint as said at least one class of said set of classes.

10. Learning process for an identification process according to claim 9, wherein a spectrogram is determined from an acoustic signal, said spectrogram is translated into a feature vector and converted into an adjoint.

11. Learning process according to claim 9, wherein said feature vector is obtained by interposing a Fourier transform.

* * * * *